United States Patent [19]

Osawa

[11] Patent Number: 4,698,253
[45] Date of Patent: Oct. 6, 1987

[54] INTERIOR COVER ASSEMBLY FOR A VEHICLE

[75] Inventor: Tomoaki Osawa, Akishima, Japan

[73] Assignee: Tachi-S Co., Ltd., Tokyo, Japan

[21] Appl. No.: 881,839

[22] Filed: Jul. 3, 1986

[51] Int. Cl.[4] .............................. B32B 3/30; B32B 7/10
[52] U.S. Cl. ..................................... 428/159; 428/160; 428/162; 428/163; 428/167; 428/172; 428/173; 428/198
[58] Field of Search .................... 428/71, 76, 161, 162, 428/163, 166, 167, 173, 179, 304.4, 152, 158, 159, 160, 198, 172

[56] References Cited

U.S. PATENT DOCUMENTS 4,480,715  11/1984  Brooks ................................. 428/173

FOREIGN PATENT DOCUMENTS 54-50081  4/1979  Japan ..................................... 428/173

Primary Examiner—William J. Van Balen
Attorney, Agent, or Firm—Oldham, Oldham & Weber Co.

[57] ABSTRACT

An interior cover assembly such as a ceiling member, a wall member, a trim cover assembly for a seat, a cushion body for a seat for use in a vehicle such as an automobile is disclosed which comprises a foam cushion member provided on the surface thereof with a large number of recesses and projections extending crosswise and alternating with one another and a covering member for covering the surface of the cushion member. The covering member is pressed and heated to be welded integrally to the recesses in the cushion member and there are formed a great number of decorative wrinkles in the covering member mainly around the welded portions of the covering member.

6 Claims, 8 Drawing Figures

INTERIOR COVER ASSEMBLY FOR A VEHICLE

BACKGROUND OF THE INVENTION

1. Field of the Invention

The present invention relates to an interior cover assembly for a vehicle, such as a vehicle ceiling cover assembly, a vehicle wall cover assembly, a trim cover assembly of a vehicle seat and a cushion body of the vehicle seat, which comprises a cushion member formed of a foam material and a covering member to cover the surface thereof. 2. Description of the Prior Art Conventionally, to manufacture an interior cover assembly of this kind, a cushion member formed of a flatplate-shaped foam material (a slab material) and a covering member for covering the surface thereof are laminated together and then they are high-frequency welded or sewn to each other to form an integral body which offers an excellent touch. Such interior cover assembly is formed in a flat shape, or in a recessed-groove shape by high-frequency welding or sewing on the covering member side thereof.

Therefore, in the above-mentioned conventional cover assembly, in order to make up for its insufficient appearance as an interior decoration, a plane pattern such as a colored pattern or the like is provided on the covering member thereof. However, the interior cover assembly having such plane or two-dimensional pattern is not found satisfactory since it cannot offer a three-dimensional feeling.

In order to elimintate the above-mentioned disadvantage, the present applicant, in Japanese Patent Publication No. 176034 of 1984, discloses a trim cover assembly for a vehicle seat which can be formed by high-frequency welding a covering member onto a cushion member having an uneven surface formed by cutting.

In the above-disclosed trim cover assembly, the covering member thereof is previously formed by heating so as to correspond to the uneven surface of the cushion member. Consequently, when the covering member is integrally welded to the cushion member, the uneven shape of the cushion member surface is allowed to develop on the surface of the covering member so as to provide a three-dimensional pattern. However, since the thus formed covering member produces no decorative wrinkles thereon, the trim cover assembly is disadvantageous in that it cannot provide a soft and flexible appearance.

SUMMARY OF THE INVENTION

The present invention aims at eliminating the disadvantages found in the above-mentioned trim cover assembly disclosed by the present applicant.

Accordingly, it is an object of the invention to provide a vehicle interior cover assembly which is improved in design.

In order to accomplish this object, according to the invention, a sheet-like thermally weldable covering member, that is, the portions thereof corresponding to the recessed portions of a cushion member are pressed into the recessed portions of the cushion member, and thereafter the covering member is welded to the cushion member to form an integral body. In other words, since a single sheet of covering member is pressed into the respective recesses in the cushion member, there are formed a large number of decorative wrinkles mainly in the welded portions of the covering member.

It is another object of the invention to provide a vehicle interior cover assembly which permits simple formation of the above-mentioned decorative wrinkles.

In attaining this object, according to the invention, a high-frequency welding machine employs a lower mold provided with a large number of rod-like electrodes which are respectively projected upwardly from the lower mold so as to bite the respective recesses in the above-mentioned cushion member. Therefore, when the above-mentioned covering member is put on the lower mold, the cushion member is placed on the covering member with its uneven surface being faced to the lower mold, a flat upper mold of a high-frequency welding machine is lowered down onto them to give pressure thereto, and high-frequency waves are applied thereto, then the rod-like electrodes of the lower mold as well as the covering member are caused to bite into the respective recesses in the cushion member, and at the same time, in the respective recesses of the cushion member, the covering member is welded integrally to the cushion member. Such integral welding of the covering member to the cushion member in the recessed portions thereof makes the welded portions hard. But, since the welded portions of the covering member are located within the recesses of the cushion member, there is no possibility of the feel of the present cover assembly being impaired.

It is still another object of the invention to provide a vehicle interior cover assembly which permits attaching the ends of another covering member around the above-mentioned cushion member.

To achieve this object, according to the invention, there is provided in the lower mold of the high-frequency welding machine a circumferential electrode around and level with a large number of rod-like electrodes formed in the lower mold. Such circumferential electrode enables the ends of another covering member to be attached by sewing, adhesion, welding or the like to the peripheries of a covering member welded to the surface of the cushion member, simultaneously when the covering member is welded onto the uneven surface of the cushion member.

The above and other related objects and features of the invention will be apparent from a reading of the following description of the disclosure found in the accompanying drawings and the novelty thereof pointed out in the appended claims.

DETAILED DESCRIPTION OF PREFERRED EMBODIMENTS OF THE INVENTION

Figure 1:
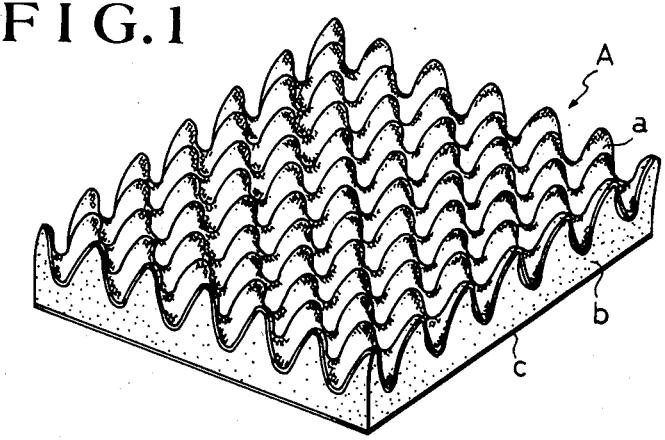
FIG. 1 is a perspective view of an embodiment of the invention.
Figure 4:
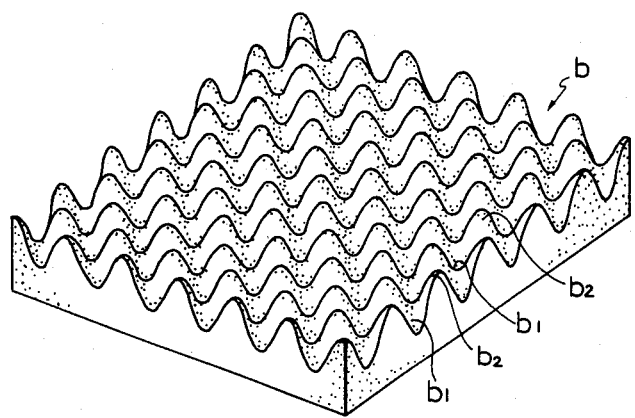
FIG. 4 is a perspective view of a cushion member employed in the invention.

Referring first to FIG. 1, there is shown an interior cover assembly for a vehicle (in particular, a trim cover assembly for an automotive seat) (A) according to the invention. In FIG. 1, reference character (a) designates a covering member, (b) represents a cushion member formed of foam material (slab material or mold-machined material), and (c) stands for a lining (nonwoven fabric). The covering member (a) is formed into a sheet-like shape out of a thermally weldable material (e.g., vinyl chloride) which can be welded by high-frequency waves or the like, and the covering member (a) is welded to the surface of the cushion member (b), in particular, in recessed portions formed in the cushion member (b). Also, the cushion member is formed of foam material (e.g., urethane foam) having a thermally weldable property as with the covering member (a), and, as shown in FIG. 4, is formed on the surface thereof with a great number of recesses (b1) and projections (b2) extending crosswise and alternating with one another. These recesses (b1) and projections (b2) are formed by profile cutting. The lining (c) is fixed to the back surface of the cushion member (b) by adhesion, welding or similar means. However, since the lining (c) is used to protect the back surface of the cushion (b), it can be saved when the cushion member (b) is mold formed, that is, the cushion member (b) is sufficiently strong.

Also, in place of the lining (c), a hard member such as a hard-board and the like may be arbitrarily used.

Figure 2:
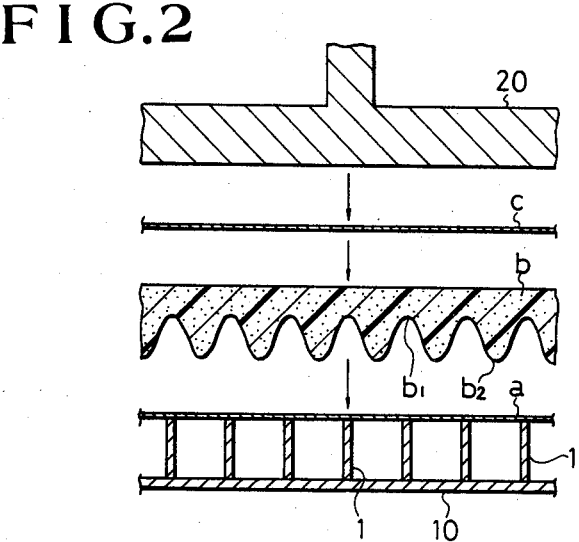
FIGS. 2 and 3 are respectively sectional views, illustrating how to form the above embodiment.
Figure 3:
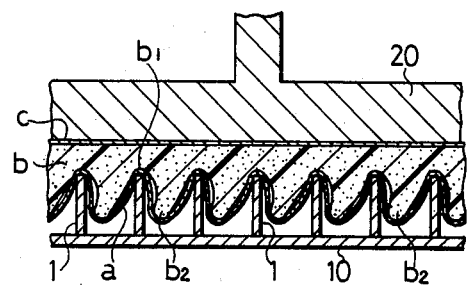

The above-mentioned interior cover assembly (A) can be welded and formed according to a method illustrated in FIGS. 2 and 3.

Figure 5:
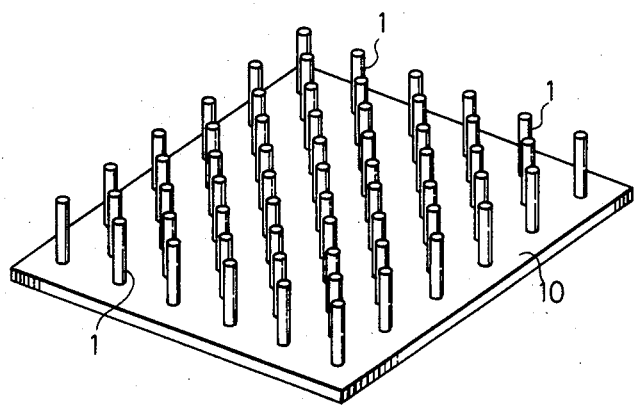
FIG. 5 is a perspective view of electrodes used to produce the invention.

In welding, a high-frequency welding machine is used and the welding machine comprises a lower mold (10), on and from which lower mold (10) there are vertically projected a great number of spaced, rod-like electrodes (1) (1)—in such a manner that they correspond to the recesses (b1)—in the cushion member (b), as shown in FIG. 5. Also, the high-frequency welding machine has an upper mold (20) and the engagement surface of the upper mold (20) is formed flat.

The above-mentioned covering member (a), cushion member (b) and lining (c) are laminated on the rod-like electrodes (1) (1)—in the lower mold (10), as shown in FIG. 2. After then, the upper mold (20) is lowered down onto the laminated body to give pressure thereto. As a result of this, the respective electrodes (1) (1)—are caused to bite into the respective recesses (b1)—in the cushion member (b), that is, the covering member (a) is pushed into the recesses (b1) by the electrodes (1) (1)—. Therefore, as shown in FIG. 3, the respective projections (b2) in the cushion member (b) are caused to fall down in one direction because they are pulled by the covering member (a). Thereafter, if high-frequency waves are applied, then the covering member (a) is welded integrally to the respective recesses of the cushion member (b), and at the same time, above these welded portions (in FIG. 3), the lining (c) is similarly welded to the cushion member (b) integrally therewith, so that a product as shown in FIG. 1 is produced.

Figure 6:
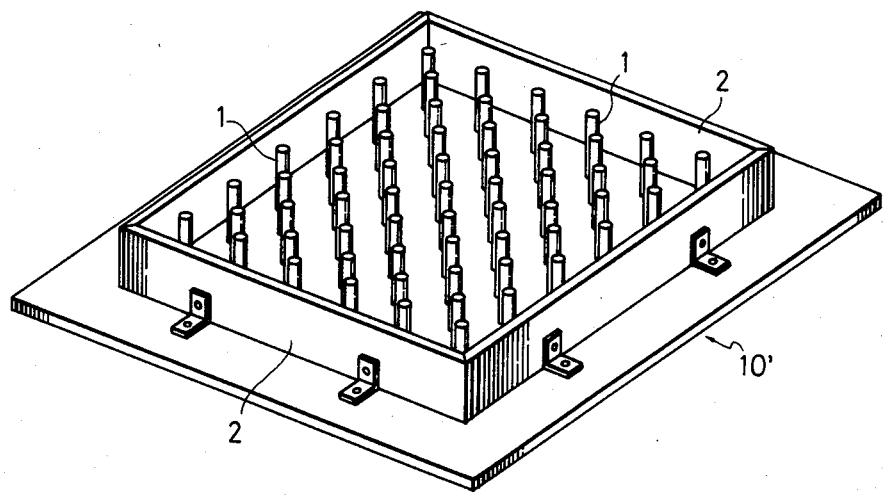
FIG. 6 is a perspective view of another embodiment of the invention, illustrating electrodes employed therein.
Figure 7:
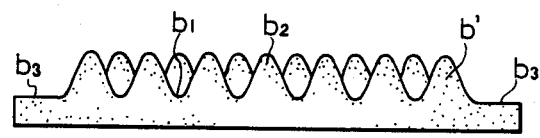
FIG. 7 is a side view of a cushion member employed in the above-mentioned second embodiment of the invention; and, FIG. 8 is a section view of the second embodiment of the invention.
Figure 8:
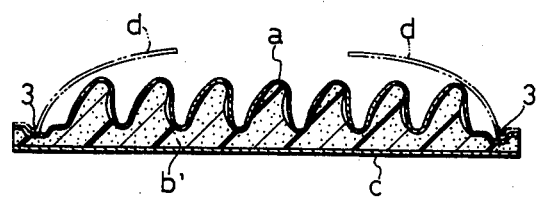

In FIG. 6, there is shown another type of lower mold (10') which is provided with a circumferential electrode (2) around the above-mentioned rod-like electrodes (1) (1)—so as to provide a sewing portion in the outer periphery thereof. In other words, as shown in FIG. 8, this lower mold (10') is used to provide a welded portion (3) by means of high frequency waves so that another covering member (b) or the like can be sewn to the periphery of the present invention. For this purpose, as shown in FIG. 7, another type of cushion member (b'), which is provided with flat portions (b3) in the outside periphery thereof in addition to recesses and projections, is employed, while the covering member (a) is welded to the cushion member (b') in a manner similar to the before-described first embodiment of the invetnion. In this case, when the covering member (a) is welded to the cushion member (b'), the flat portions (b3) of the cushion member (b') are collapsed and welded by the circumferential electrode (2) to provide the welded portions (3). Therefore, the covering member (d) is applied to the welded portions (3) with its face downward and is then sewn thereto, as shown by two-dot lines in FIG. 8.

As has been discussed hereinbefore, according to the invention, a sheet-shaped covering member is pressed against and welded to the respective recesses of a cushion member by means of rod-like electrodes provided in a lower mold so as to provide an integral body. Also, when the covering member is pressed by the electrodes, projections in the cushion member are collapsed because they are pulled by the covering member. Due to the elasticity of the collapsed projections, the covering member, after welded, is in turn pulled around the welded portion thereof so as to produce a large number of decorative wrinkles mainly around the welded portion thereof. Accordingly, the present invention can provide an interior cover assembly which has a more flexible outer surface than the disclosed one previously applied by the present applicant.

What is claimed is:

1. An interior cover assembly for a vehicle comprising a cushion member of foam material, said cushion member being provided on the surface thereof with a large number of projections and recesses extending crosswise and alternating with one another, and a covering member for covering said surface of said cushion member, wherein said covering member comprises a sheet shaped, thermally weldable covering member disposed over said cushion member, wherein said covering member has been pressed and heated in the areas corresponding to the respective said recesses in said cushion member so that said covering member is integrally welded to said recesses in said cushion member, so as to provide a plurality of welded portions therein, thereby causing said covering member to be pulled by said projections of said cushion members due to the elasticity thereof so as to produce a large number of decorative wrinkles in said covering member, mainly around said welded portions.

2. An interior cover assembly for a vehicle according to claim 1, wherein said pressure and heating of said covering member is performed by means of a large number of rod-like electrodes vertically projected from a lower mold of a high-frequency welding machine so as to correspond to counterpart of recesses in said cushion member.

3. An interior cover assembly for a vehicle according to claim 1, wherein said cushion member includes a flat back surface to which a thermally weldable lining, together with said covering member, have been pressed and heated so that said weldable lining, said covering member, and said cushion member are integrally welded together.

4. An interior cover assembly for a vehicle according to claim 1, wherein a hardboard is adhered to said back surface of said cushion member.

5. An interior cover assembly for a vehicle according to claim 1, wherein said high-frequency welding machine includes an upper mold having a flat pressure surface.

6. An interior cover assembly for a vehicle as set forth in claim 2, wherein said lower mold of said high-frequency welding machine has a circumferential electrode provided in the periphery thereof, and further has a large number of rod-like electrodes within said circumferential electrode.

* * * * *